United States Patent
Lee et al.

(10) Patent No.: US 9,939,513 B2
(45) Date of Patent: Apr. 10, 2018

(54) APPARATUS AND METHOD FOR FINDING HYBRID DIRECTION USING TWO BASELINES

(71) Applicant: ELECTRONICS AND TELECOMMUNICATIONS RESEARCH INSTITUTE, Daejeon (KR)

(72) Inventors: Jeom Hun Lee, Daejeon (KR); Jae Hoon Kim, Daejeon (KR); Sang Uk Lee, Daejeon (KR); In One Joo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 432 days.

(21) Appl. No.: 14/628,315

(22) Filed: Feb. 23, 2015

(65) Prior Publication Data

US 2016/0069979 A1 Mar. 10, 2016

(30) Foreign Application Priority Data

Sep. 5, 2014 (KR) .................. 10-2014-0118461
Nov. 24, 2014 (KR) .................. 10-2014-0164563

(51) Int. Cl.
  *G01S 3/58* (2006.01)
  *G01S 3/20* (2006.01)
  *G01S 3/46* (2006.01)

(52) U.S. Cl.
  CPC .................. *G01S 3/58* (2013.01); *G01S 3/20* (2013.01); *G01S 3/46* (2013.01)

(58) Field of Classification Search
  CPC ..... G01S 3/58; G01S 3/12; G01S 3/20; G01S 3/14; G01S 3/46
  See application file for complete search history.

(56) References Cited

U.S. PATENT DOCUMENTS 6,480,153 B1  11/2002  Jung et al.
7,893,885 B2  2/2011  Jung et al.
(Continued)

FOREIGN PATENT DOCUMENTS

KR  10-2012-0067711 A  6/2012
KR  10-2013-0080765 A  7/2013
(Continued)

OTHER PUBLICATIONS

Joong-Soo Lim et al., "A Technology of Microwave Direction Finding with Circular Array Combination Method", The Korean Institute of Electronmagnetic Engineering and Science, vol. 16, No. 6, pp. 549-555, Jun. 2005, English Abstract.

*Primary Examiner* — Cassi J Galt
(74) *Attorney, Agent, or Firm* — Rabin & Berdo, P.C.

(57) ABSTRACT

Disclosed is a hybrid direction detection apparatus and method that may perform a precise direction detection through a one-time rotation of a log period (LP) antenna and a one-time phase difference measurement of a dipole antenna and may remove an ambiguity error of the LP antenna by two dipole antennas spaced apart by a distance of about 0.5λ by finding an approximate direction using the LP antenna that is a directional antenna, by measuring a phase difference between arrival waves using two baselines including two dipole antenna in the corresponding direction, and thereby precisely finding a final direction.

19 Claims, 8 Drawing Sheets

(56) References Cited

U.S. PATENT DOCUMENTS

2013/0176183 A1     7/2013  Boni et al.
2013/0207844 A1*    8/2013  Lee .......................... G01S 3/58
                                                          342/442

FOREIGN PATENT DOCUMENTS

KR    10-2013-0094165 A    8/2013
KR    10-2014-0006275 A    1/2014

* cited by examiner

APPARATUS AND METHOD FOR FINDING HYBRID DIRECTION USING TWO BASELINES

CROSS-REFERENCE TO RELATED APPLICATIONS

This application claims priority to and the benefit of Korean Patent Application No. 10-2014-0118461 filed in the Korean Intellectual Property Office on Sep. 5, 2014 and Korean Patent Application No. 10-2014-0164563 filed in the Korean Intellectual Property Office on Nov. 24, 2014, the entire contents of which are incorporated herein by reference.

TECHNICAL FIELD

The present invention relates to an apparatus and method for detecting a direction of a wave signal source, and more particularly, to an apparatus and method for quickly and accurately detecting a direction of a wave signal source using a direction detection method by comparison of an amplitude or signal strength, a virtual Doppler method, an interferometry method using a phase difference comparison, and the like.

BACKGROUND ART

A method of detecting a direction of a wave signal source, that is, a direction detection method generally uses an angle of arrival (AOA) method. A direction detection method using an amplitude or signal strength comparison, a virtual Doppler method, an interferometry method using a phase difference comparison, and the like, are used as the AOA method.

The amplitude or signal strength comparison method sets, as a direction, a point at which a signal strength is at a maximum in a state in which a directional antenna is being rotated or fixed. Thus, the larger an antenna size (the smaller 3 dB width), the better the accuracy.

The virtual Doppler method needs to generate a virtual Doppler by electrically rotating a circular array omni-directional antenna. Thus, the larger a rotation per minute (RPM) and the larger a rotation radius, the better the accuracy.

The basic concept of the interferometry method using the phase difference comparison is to find a direction of a signal as expressed by Equation 1 by measuring a phase difference between signals received by the interferometry based on two fixed omni-directional antennas as a single baseline as shown in FIG. 1. However, an array of a minimum of five antennas as shown in FIG. 2 is required to precisely find a direction, and a radio frequency (RF) apparatus or a portion for signal processing is complex. In Equation 1, denotes a wavelength, $\Delta\Phi$ denotes a phase difference, $\varphi$ denotes an AOA, and d denotes a distance between two antennas.

$$\Delta\phi = -\frac{2\pi d}{\lambda}\sin(\varphi) \quad \text{[Equation 1]}$$

That is, the amplitude or signal comparison method among AOA methods requires an antenna having an aperture surface having greater directivity to obtain a high precision. Thus, there is limitation on an antenna size. The virtual Doppler method requires thousands to tens of thousands electrical RPM, which leads to complexity and high cost. The fixed phase comparison method requires a minimum of five circular array antennas to detect the omni-directions (0 degrees to 360 degrees). The accuracy increases as the number of array antennas increases. However, as the number of array antennas increases, the number of RF elements increases and signal processing becomes complex.

As shown in FIG. 3, it is possible to increase the accuracy of direction detection with the phase comparison method using a log period dipole array (LPDA) that includes a single baseline including a log period (LP) antenna that is a directional antenna and two dipole antennas. In the related art, an approximate direction is found based on a signal strength by rotating the LP antenna, and a precise direction is found by measuring a phase difference between signals received by the dipole antennas around an angle found by the LP antenna. However, in the case of inflow of a severe reflected wave, a peak pattern of received signals by the LP antenna is distorted, thereby causing an ambiguity error that an AOA value around zero degrees with respect to a zero-degree phase difference to be detected is not detected and an AOA value by other reflected signals is detected, as shown in FIG. 4.

Accordingly, proposed is a more precise and economical direction detection method.

SUMMARY OF THE INVENTION

The present invention has been made in an effort to provide a hybrid direction detection apparatus and method that may perform a precise direction detection through a one-time rotation of a log period (LP) antenna and a one-time phase difference measurement of a dipole antenna and may remove an ambiguity error of the LP antenna by two dipole antennas spaced apart by a distance of about 0.5λ when finding an approximate direction using the LP antenna that is a directional antenna, by measuring a phase difference between arrival waves using two baselines including two dipole antennas in the corresponding direction, and thereby precisely finding a final direction.

An exemplary embodiment of the present invention provides an apparatus for detecting a hybrid direction, the apparatus including: a rotary machine; a log period antenna, a first dipole antenna, and a second dipole antenna installed on a rotating shaft of the rotary machine; and a phase signal processing apparatus configured to control the rotary machine to rotate the rotating shaft, to approximately determine a direction of a wave signal source based on strength of a signal received via the log period antenna to thereby suspend the rotation, and to determine an angle with respect to the direction of the wave signal source based on a phase difference between signals received via the first dipole antenna and the second dipole antenna in a state in which the rotation of the rotating shaft is suspended.

The first dipole antenna including two conductors and the second dipole antenna including two other conductors are spaced apart from each other at a predetermined distance and thereby aligned on a straight line.

The signal processing apparatus determines the angle with respect to the direction of the wave signal source through a one-time rotation of the log period antenna and a one-time determination of a first phase difference between signals received from two most distant conductors among four conductors constituting the first dipole antenna and the second dipole antenna, and a second phase difference between signals received from the two remaining conductors constituting the first dipole antenna and the second dipole antenna.

The signal processing apparatus calculates at least one first angle of arrival (AOA) about the first phase difference, calculates at least one second AOA about the second phase difference, and determines the angle with respect to the direction of the wave signal source by selecting any one of at least one first AOA based on whether a minimum absolute value among at least one second AOA is within a predetermined range from "0".

The signal processing apparatus calculates an AOA using the following equation, $$AOA(\Delta\phi, Ka) = \sin^{-1}\left(\lambda \frac{\Delta\phi + 360Ka}{2\pi d}\right)$$

Here, $\lambda$ denotes a signal wavelength, d denotes a distance between two corresponding conductors of a dipole antenna, Ka denotes $\pm n$, n=1 when $0.5 < d/\lambda < 1$, and n=4 when $1.1 < d/\lambda < 3.5$.

The signal processing apparatus sequentially performs an amplification of the signal received via the log period antenna, a frequency-down conversion, an analog-to-digital (A/D) signal conversion, and a signal strength calculation while rotating the rotating shaft, and determines a direction in which the strength of the signal is relatively great, as an approximate direction of the wave signal source.

The signal processing apparatus includes: a first switch configured to select any one of two signals of the first dipole antenna; a second switch configured to select any one of two signals of the second dipole antenna; a first frequency-down converter connected to an output of the first switch and a first A/D converter connected to an output of the first frequency-down converter; a second frequency-down converter connected to an output of the second switch and a second A/D converter connected to an output of the second frequency-down converter; a phase difference detector configured to detect a phase difference between output signals of the first A/D converter and the second A/D converter; and a determiner connected to the phase difference detector and configured to determine the angle with respect to the direction of the wave signal source.

The signal processing apparatus further includes: a first low noise amplifier (LNA) and a third LNA connected to the two conductors of the first dipole antenna, respectively; and a second LNA and a fourth LNA connected to the two conductors of the second dipole antenna, respectively. The first switch may select any one of an output of the first LNA and an output of the third LNA, and the second switch may select any one of an output of the second LNA and an output of the fourth LNA.

The first LNA and the second LNA are connected to the two most distant conductors among the four conductors constituting the first dipole antenna and the second dipole antenna, respectively, and the third LNA and the fourth LNA are connected to the two other conductors among the four conductors constituting the first dipole antenna and the second dipole antenna, respectively.

The phase difference detector may detect a first phase difference with respect to the output of the first LNA and the output of the second LNA and a second phase difference with respect to the output of the third LNA and the output of the fourth LNA, and the determiner may determine the angle with respect to the direction of the wave signal source by comparing and analyzing the first phase difference and the second phase difference.

The determiner may calculate at least one first angle of arrival (AOA) about the first phase difference, may calculate at least one second AOA about the second phase difference, and may determine the angle with respect to the direction of the wave signal source by selecting any one of at least one first AOA based on whether a minimum absolute value among at least one second AOA is within a predetermined range from "0".

The determiner may determine a minimum first absolute value among at least one first AOA as the angle with respect to the direction of the wave signal source when a minimum second absolute value among at least one second AOA is within the predetermined range from "0", and may determine a value having a smallest difference with the minimum second absolute value among at least one first AOA as the angle with respect to the direction of the wave signal source when the minimum second absolute value is not within the predetermined range from "0".

Another exemplary embodiment also provides a method of detecting a direction of a received signal at a hybrid direction detection apparatus using a log period antenna and a dipole antenna, the method including: approximately determining a direction of a wave signal source based on a strength of a signal received via the log period antenna by rotating the log period antenna, a first dipole antenna, and a second dipole antenna installed on a rotating shaft; and determining an angle with respect to the direction of the wave signal source based on a phase difference between signals received via the first dipole antenna and the second dipole antenna in a state in which the rotation of the rotating shaft is suspended.

The first dipole antenna including two conductors and the second dipole antenna including the two other conductors are spaced apart from each other at a predetermined distance and thereby aligned on a straight line.

The direction detection method of the received signal is to determine the angle with respect to the direction of the wave signal source through a one-time rotation of the log period antenna and a one-time determination of a first phase difference between signals received from two most distant conductors among four conductors constituting the first dipole antenna and the second dipole antenna and a second phase difference between signals received from the two remaining conductors constituting the first dipole antenna and the second dipole antenna.

The determining of the angle with respect to the direction of the wave signal source includes: calculating at least one first AOA about the first phase difference, and calculating at least one second AOA about the second phase difference; and determining the angle with respect to the direction of the wave signal source by selecting any one of at least one first AOA based on whether a minimum absolute value among at least one second AOA is within a predetermined range from "0".

The determining of the angle with respect to the direction of the wave signal source may determine a minimum first absolute value among at least one first AOA as the angle with respect to the direction of the wave signal source when a minimum second absolute value among at least one second AOA is within the predetermined range from "0", and may determine a value having a smallest difference with the minimum second absolute value among at least one first AOA as the angle with respect to the direction of the wave signal source when the minimum second absolute value is not within the predetermined range from "0".

The AOA is calculated using the following equation, $$AOA(\Delta\phi, Ka) = \sin^{-1}\left(\lambda\frac{\Delta\phi + 360Ka}{2\pi d}\right)$$

Here, $\lambda$ denotes a signal wavelength, d denotes a distance between two corresponding conductors of a dipole antenna, Ka denotes ±n, n=1 when 0.5<d/$\lambda$<1, and n=4 when 1.1<d/$\lambda$<3.5.

The approximate determining of the direction of the wave signal source includes sequentially performing an amplification of the signal received via the log period antenna, a frequency-down conversion, an A/D signal conversion, and a signal strength calculation while rotating the rotating shaft, and determining a direction in which the strength of the signal is relatively great, as an approximate direction of the wave signal source.

According to a hybrid direction detection apparatus and method using two baselines according to exemplary embodiments of the present invention, it is possible to measure an AOA around zero degrees among phase differences of waves received by two dipole antennas and thus, it is possible to very precisely detect a direction of a wave signal source.

It is also possible to remove an ambiguity error of an LP antenna due to a severely reflected signal using two dipole antennas spaced apart by a distance of about 0.5λ.

Even though a direction detection method with at least five circular array antennas cannot perform a direction detection with respect to a multi-reflected signal, the present invention uses an LP antenna and thus, it is possible to perform an approximate direction detection even with respect to the multi-reflected signal.

A precise direction detection may be performed through a one-time rotation of the LP antenna and a one-time phase difference measurement of dipole antennas. Thus, compared to existing methods, it is possible to perform a very economical direction detection without using a large antenna or a circular array antenna and through a decrease in a rotation per minute (RPM) of the LP antenna.

Figure 1:
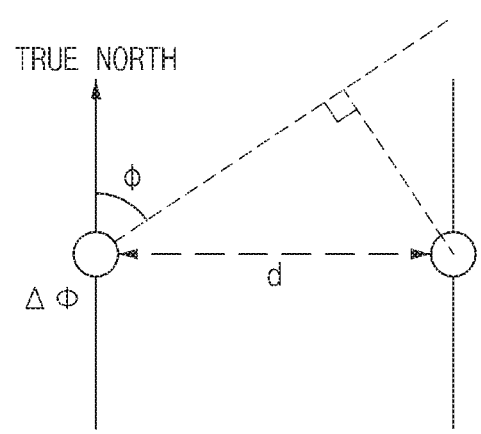
FIG. 1 is a diagram to describe interferometry for wave direction detection according to the related art.
Figure 2:
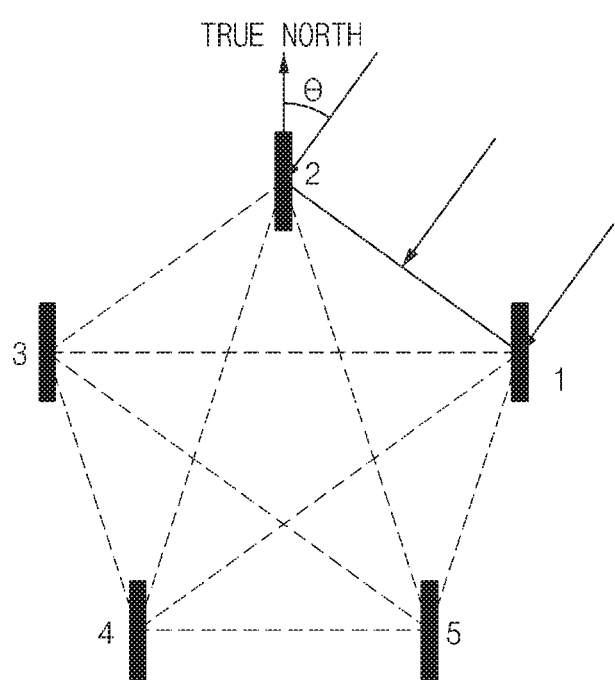
FIG. 2 is a diagram to describe a multi-baseline antenna array for wave direction detection according to the related art.
Figure 3:
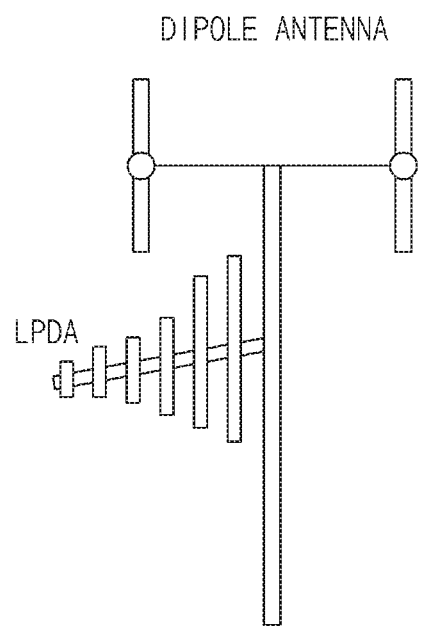
FIG. 3 is a diagram to describe an antenna configuration including a log period (LP) antenna and a single baseline for wave direction detection according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to the accompanying drawings. Here, like reference numerals in each drawing refer to like constituent elements throughout the present specification. Also, a detailed description related to a known function and/or configuration is omitted. In the following description, a description is made based on a portion required to understand the operation according to various exemplary embodiments and a description related to elements that may render the essentials of explanations ambiguous is omitted. Also, some constituent elements of drawings may be exaggerated, omitted, or schematically illustrated. A size of each constituent element does not fully apply an actual size. Accordingly, descriptions disclosed herein are not restricted by relative sizes or intervals of constituent elements illustrated in each drawing.

Figure 5:
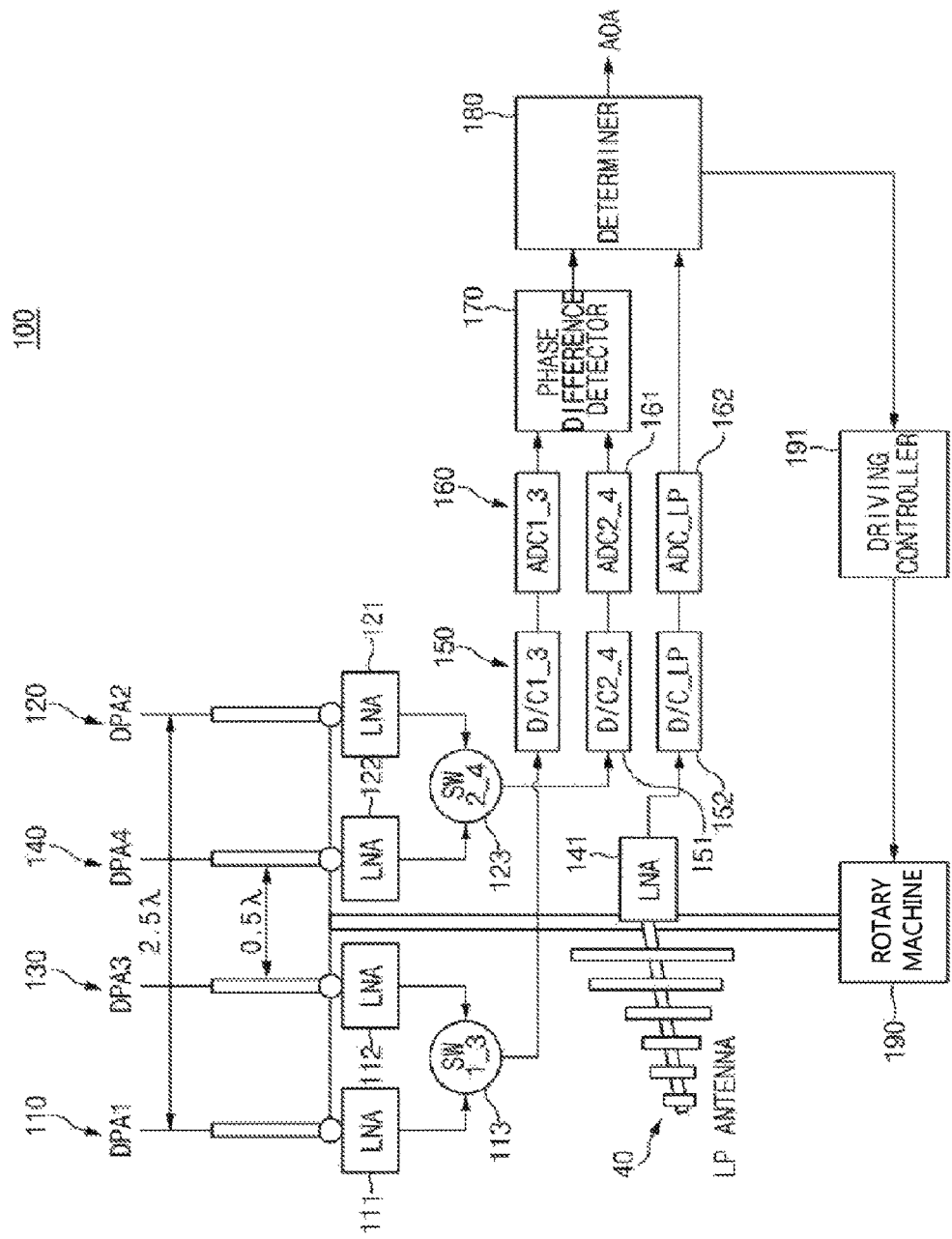
FIG. 5 is a diagram to describe a hybrid direction detection apparatus using two baselines according to an exemplary embodiment of the present invention.

FIG. 5 is a diagram to describe a hybrid direction detection apparatus 100 using two baselines according to an exemplary embodiment of the present invention.

Referring to FIG. 5, the hybrid direction detection apparatus 100 using the two baselines according to an exemplary embodiment of the present invention includes a rotary machine 190, a log period (LP) antenna 40, and a first dipole antenna (a conductor DPA1 110 and a conductor DPA3 130) and a second dipole antenna (a conductor DPA2 120 and a conductor DPA4 140) that constitute two baselines. The log period (LP) antenna 40, first dipole antenna (a conductor DPA1 110 and a conductor DPA3 130) and a second dipole antenna (a conductor DPA2 120 and a conductor DPA4 140) are installed on a rotating shaft of the rotary machine 190. Here, the first dipole antenna (the conductor DPA1 110 and the conductor DPA3 130) and the second dipole antenna (the conductor DPA2 120 and the conductor DPA4 140) may be spaced apart from each other by a predetermined distance (for example, 0.5λ) on a support fixed in an upper portion of the rotating shaft of the rotary machine 190 and thereby aligned on a straight line. A distance between conductors of each dipole antenna may be determined as a predetermined value. However, FIG. 5 illustrates an example in which the conductors are spaced apart from each other by 1.0λ. Here, λ denotes a wavelength of received wave.

The hybrid direction detection apparatus 100 of the present invention further includes a signal processing apparatus to process signals received by the LP antenna 40 and dipole antennas (110, 120, 130, and 140). The signal processing apparatus includes low noise amplifiers (LNAs) 111 and 112 connected to the first dipole antenna (the conductor DPA1 110 and the conductor DPA3 130), a switch 113 connected to the LNAs 111 and 112, LNAs 121 and 122 connected to the second dipole antenna (the conductor DPA2 120 and the conductor DPA4 140), and a switch 123 connected to the LNAs 121 and 122. Also, the signal processing apparatus further includes a frequency-down converter 150 connected to the switch 113 and an analog-to-digital (A/D) converter 160 connected to the frequency-down converter 150, and further includes a frequency-down converter 151 connected to the switch 123 and an A/D converter 161 connected to the frequency-down converter 151. Also, the signal processing apparatus further includes an LNA 141 connected to the log period antenna 40, a frequency-down converter 152 connected to the LNA 141, and an A/D converter 162 connected to the frequency-down converter 152. Also, digital signals of the A/D converters 160 and 161 may be output to a phase difference detector 170, and a phase difference signal of the phase difference detector 170 and a digital signal of the A/D converter 162 are output to a determiner 180. The determiner 180 determines an angle (AOA) with respect to a direction of a wave signal source finally determined, generates control signals required to control whether to rotate the rotary machine 190, and outputs the generated control signals to a driving controller 191. In response to the control signals, the driving controller 191 controls or suspends a driving of the rotary machine 190 so that the rotary machine 190 rotates.

Initially, an operation of the hybrid direction detection apparatus 100 according to an exemplary embodiment of the present invention will be briefly described.

The present invention approximately determines a direction (for example, an angle based on the true north) of a wave signal source based on a strength of a signal received via the LP antenna 40 while controlling the rotary machine 190 to rotate a rotating shaft through the aforementioned signal processing apparatus. Next, the signal processing apparatus may suspend the rotation of the rotary shaft of the rotary machine 190, and may finally determine an angle with respect to a direction of the wave signal source based on a phase difference between signals received via the first dipole antenna (110 and 130) and the second dipole antenna (120 and 140) around the approximate direction (for example, ±10 degrees of the determined angle) of the wave signal source in a state in which the rotation of the corresponding rotating shaft is suspended.

In the present invention, the signal processing apparatus may finally precisely determine the angle with respect to the direction of the wave signal source with a one-time rotation of the LP antenna 40 and a one-time phase difference determination, that is, a one-time determination of a phase difference (a first phase difference) between signals received at the two most distant conductors (110 and 120) among the four conductors constituting the first dipole antenna (110 and 130) and the second dipole antenna (120 and 140) and a phase difference (a second phase difference) between signals received two remaining conductors (130 and 140) constituting the first dipole antenna (110 and 130) and the second dipole antenna (120 and 140). As described above, the precise direction detection may be performed once the one-time rotation of the LP antenna 40 and the one-time phase-difference measurement using dipole antennas are performed. Thus, compared to existing methods, it is possible to perform a very economical direction detection without using a large antenna or a circular array antenna as in the related art, and without using a relatively large RPM of the LP antenna 40.

Figure 4:
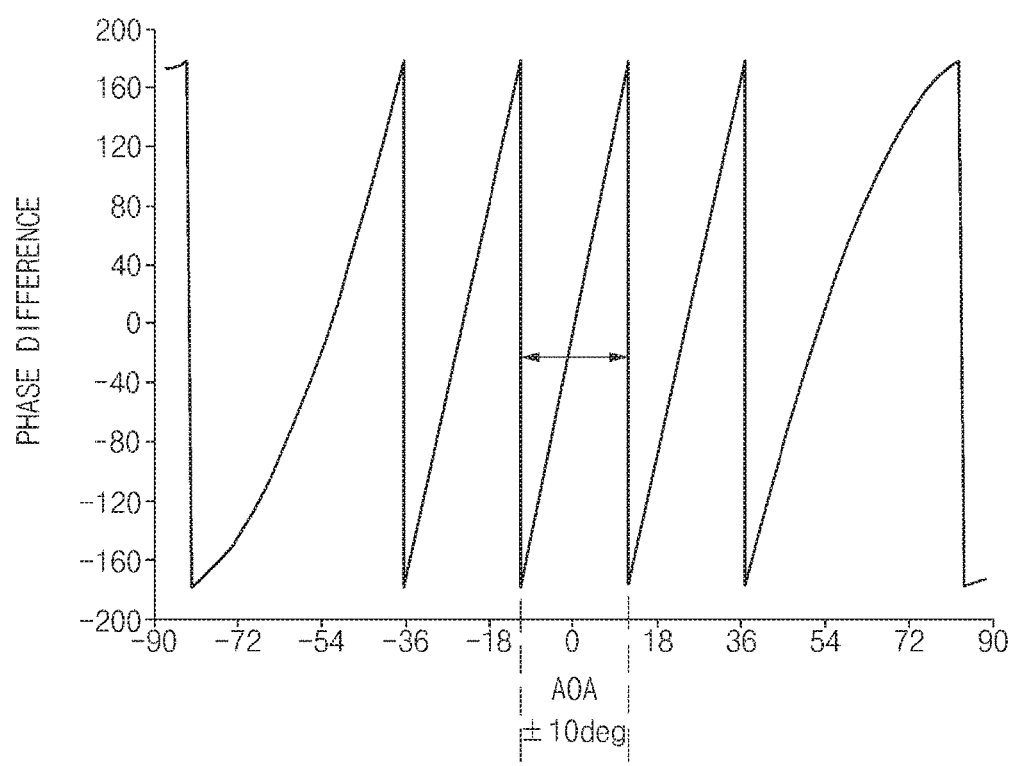
FIG. 4 is a graph to describe an example (@ 1575.42 MHz, d=0.52λ) of an angle of arrival (AOA) angle according to a phase difference in a method of FIG. 3.
Figure 6:
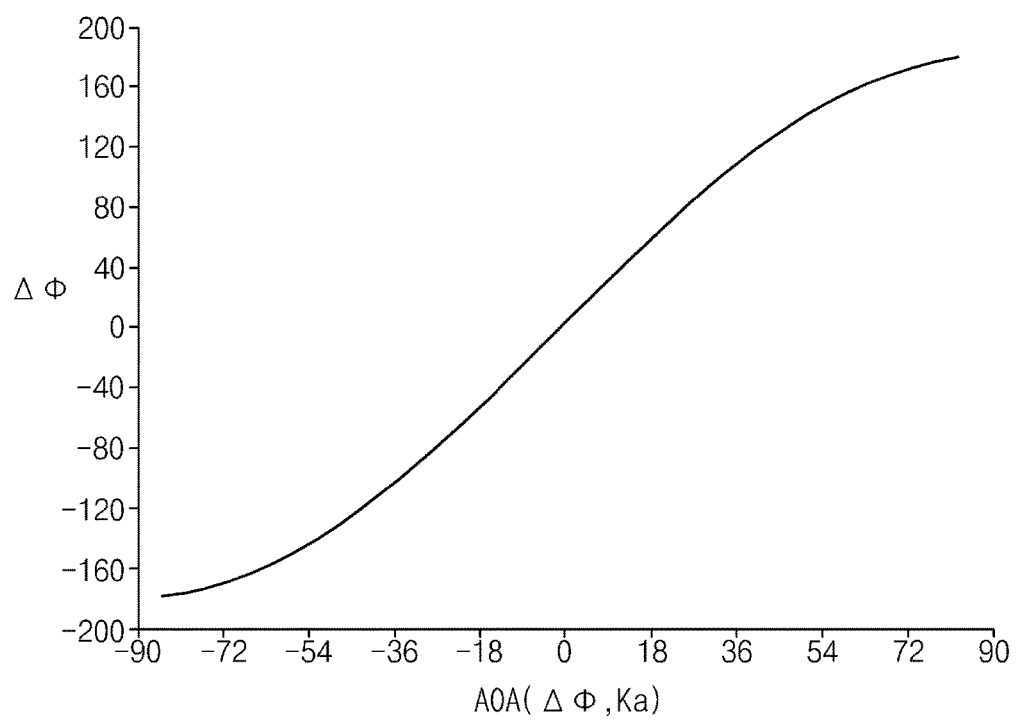
FIG. 6 is a graph showing a relationship between phase differences between waves received by two dipole antennas of FIG. 5 and an AOA.

As shown in FIG. 5, when a distance between the first dipole antenna (110 and 130) and the second dipole antenna (120 and 140) is 0.5λ, a relationship between a measured or determined phase difference and an AOA (an angle with respect to the direction of the wave signal source) is shown in FIG. 6. That is, the present invention adds one more dipole antenna compared to the related art and thus, only a single AOA value is present with respect to a single phase difference as shown in FIG. 6. An ambiguity error that an AOA value with respect to reflected signals is detected as shown in FIG. 4 is prevented.

Figure 7:
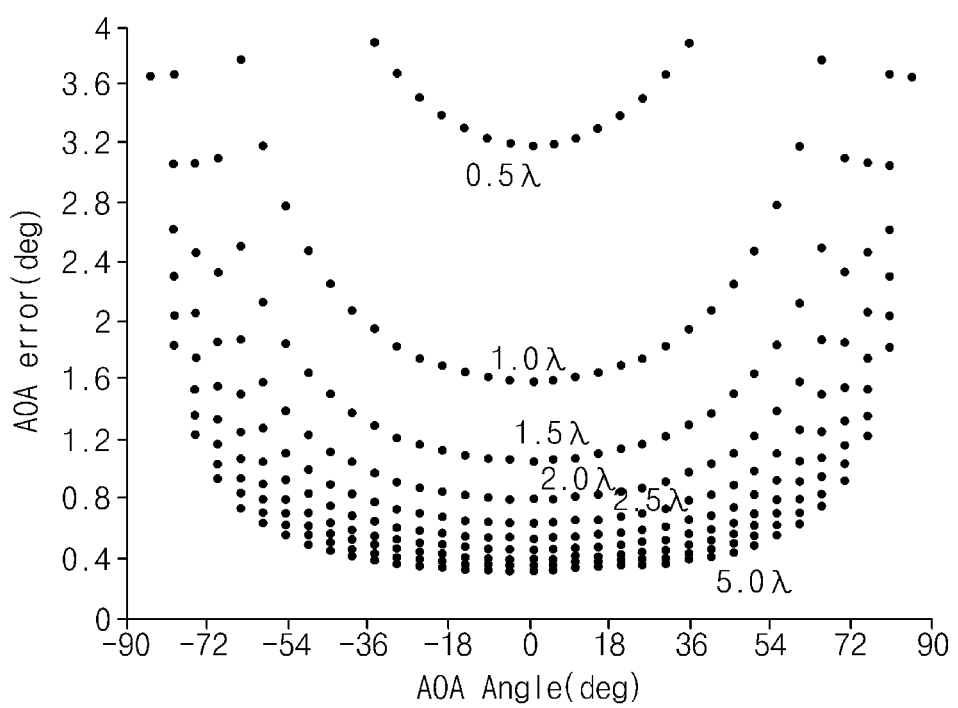
FIG. 7 is a graph showing a relationship between an AOA according to a distance between the two dipole antennas of FIG. 5 and an AOA error.

In the present invention, as can be seen from a graph of FIG. 7 showing a relationship between an AOA according to a distance between the first dipole antenna (110 and 130) and the second dipole antenna (120 and 140) and an AOA error, the AOA error (a difference with a substantial direction angle with respect to the true north) may occur to some extents when the distance between the first dipole antenna (110 and 130) and the second dipole antenna (120 and 140) is 0.5λ. However, by decreasing the distance between dipole antennas as above, the ambiguity error by reflected signals is prevented. That is, even though the AOA error may decrease as the distance between the dipole antennas increases, the ambiguity error of FIG. 4 is still likely to occur. Accordingly, the ambiguity error may be prevented by decreasing the distance between the dipole antennas. When the distance between the dipole antennas increases, a peak pattern of signals received at the LP antenna 40 may be distorted due to reflected signals. In this instance, an AOA different from a substantial direction angle instead of an AOA value around zero degrees with respect to a zero-degree phase difference may be detected (see FIG. 4).

Figure 8:
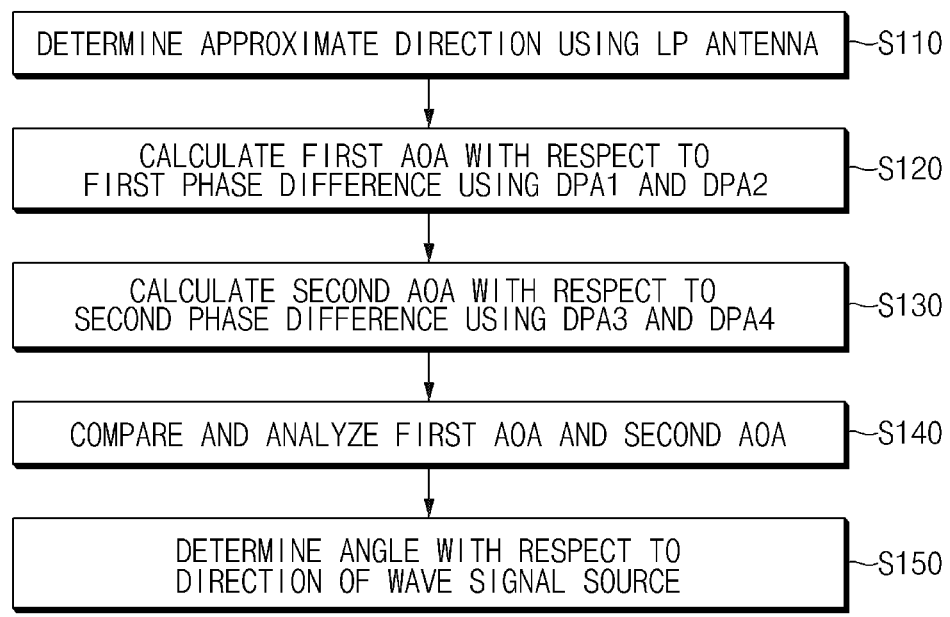
FIG. 8 is a flowchart to describe an operation of a hybrid direction detection apparatus according to an exemplary embodiment of the present invention.

Hereinafter, an operation of the hybrid direction detection apparatus 100 according to an exemplary embodiment of the present invention will be described with reference to a flowchart of FIG. 8.

Initially, the determiner 180 approximately determines a direction (for example, an angle with respect to the true north) of a wave signal source based on a strength of a signal received through the LP antenna 40, while controlling the rotary machine 190 to rotate the rotating shaft (S110).

To this end, the determiner 180 may generate a predetermined control signal and may output the generated control signal to the driving controller 191 and accordingly, the driving controller 191 may control a driving of the rotary machine 190 to rotate the rotating shaft of the rotary machine 190 about once and then, suspend the driving of the rotary machine 190. Accordingly, while the rotating shaft of the rotary machine 190 is rotating, the LNA 141 amplifies the signal received via the LP antenna 40 and the frequency-down converter 152 converts an output signal of the LNA 141 to a frequency-down converted intermediate frequency (IF) signal. Also, the A/D converter 162 processes the IF signal of the frequency-down converter 152 and converts the IF signal to a corresponding digital signal. The determiner 180 calculates a strength of a signal with respect to the digital signal of the A/D converter 162. The determiner 180 may calculate the strength of the signal using a signal processing scheme such as a fast Fourier transform (FFT) and the like, and may determine, as the approximate direction (for example, the angle based on the true north) of the wave signal source, a direction in which the strength of the calculated signal is relatively large. The determiner 180 may generate a corresponding control signal to suspend the rotating shaft of the rotary machine 190 in the approximate direction of the corresponding wave signal source, thereby controlling the driving controller 191 to suspend the driving of the rotary machine 190. The rotation of the rotating shaft of the rotary machine 190 may be suspended around about ±10 degrees of the angle determined as the approximate direction (for example, the angle based on the true north) of the wave signal source.

When the rotation of the rotating shaft of the rotary machine 91 is suspended, the determiner 180 may finally determine the angle with respect to the direction of the wave signal source based on a phase difference between signals received via the first dipole antenna (110 and 130) and the second dipole antenna (120 and 140) around the approximate direction (for example, ±10 degrees of the determined angle) of the wave signal source (S120 to S150).

To this end, the determiner 180 initially calculates a first AOA with respect to a first phase difference measured using the two most distant conductors, that is, the DPA1 110 and the DPA2 120 among four conductors constituting the first dipole antenna (110 and 130) and the second dipole antenna (120 and 140) (S120).

That is, the first switch 113 and the second switch 113 select and output amplified signals of the LNA 111 and 121 connected to the DPA1 110 and the DPA2 120, respectively, according to a switching control signal of the determiner 180. Accordingly, the frequency-down converter 150 converts an output signal of the LNA 111 to a frequency-down converted IF signal, and the frequency-down converter 151 frequency-down converts an output signal of the LNA 121 to the IF signal. Also, the A/D converter 160 processes the IF signal of the frequency-down converter 150 and thereby converts the processed IF signal to a corresponding digital signal. The A/D converter 161 processes the IF signal of the frequency-down converter 151 and converts the processed IF signal to a corresponding digital signal. The phase difference detector 170 detects a first phase difference between corresponding signals by processing output signals of the A/D converters 160 and 161. In this instance, the determiner 180 determines at least one angle (first AOA) with respect to the direction of the wave signal source as expressed by Equation 2 with respect to the first phase difference signal of the phase difference detector 170. Here, λ denotes a received signal wavelength, d denotes a distance between corresponding selected two conductors of dipole antennas, Ka denotes ±n, n=1 when 0.5<d/λ<1, and n=4 when 1.1<d/λ<3.5.

$$AOA(\Delta\phi, Ka) = \sin^{-1}\left(\lambda\frac{\Delta\phi + 360Ka}{2\pi d}\right) \quad \text{[Equation 2]}$$

The determiner 180 calculates a second AOA with respect to a second phase difference measured using other inwardly disposed two conductors, that is, the DPA3 130 and the DPA4 140 among the four conductors constituting the first dipole antenna (110 and 130) and the second dipole antenna (120 and 140) (S130).

That is, the first switch 113 and the second switch 123 select and output amplified signals of the LNA 112 and 122 connected to the DPA3 130 and the DPA4 140, respectively, according to a switching control signal of the determiner 180. Accordingly, the frequency-down converter 150 frequency-down converts an output signal of the LNA 112 to an IF signal, and the frequency-down converter 151 frequency-down converts an output signal of the LNA 122 to an IF signal. Also, the A/D converter 160 processes the IF signal of the frequency-down converter 150 and thereby converts the IF signal to a corresponding digital signal, and the A/D converter 161 processes the IF signal of the frequency-down converter 151 and thereby converts the IF signal to a corresponding digital signal. The phase difference detector 170 detects a second phase difference between corresponding signals by processing output signals of the A/D converters 160 and 161. In this instance, the determiner 180 determines at least one angle (second AOA) with respect to the direction of the wave signal source as expressed by Equation 2 with respect to the second phase difference signal of the phase difference detector 170.

The determiner 180 may compare and thereby analyze the first phase difference and the second phase difference detected by the phase difference detector 170 (S140), and may finally determine the angle with respect to the direction of the wave signal source (S150). That is, depending on whether a minimum absolute value among the at least one second AOA is within a predetermined range (for example, ±10 degrees) from "0", the determiner 180 may select any one of the at least one first AOA and thereby determine the selected first AOA as the final angle with respect to the direction of the wave signal source.

For example, when the second AOA calculated with respect to the second phase difference according to a selection of the DPA3 130 and the DPA4 140 is around zero degrees (for example, ±10 degrees), the determiner 180 determines the first AOA calculated with respect to the corresponding first phase difference according to the selection of the DPA3 130 and the DPA4 140 as a final direction angle with respect to the direction of the wave signal source.

That is, when a minimum absolute value (a second absolute value) among the at least one second AOA is within the predetermined range (for example, ±10 degrees) from zero degrees, the determiner 180 may determine a minimum absolute value (a first absolute value) among the at least one first AOA as a final angle with respect to the direction of the wave signal source. Also, when the minimum absolute value (a second absolute value) among the at least one second AOA is not within the predetermined range (for example, ±10 degrees) from zero degrees, the determiner 180 may determine a value having a smallest difference with the minimum second absolute value among the at least one first AOA as the final angle with respect to the direction of the wave signal source.

For example, when an approximate angle with respect to the direction of the wave signal source determined by the determiner 180 by measuring a received signal using the LP antenna 40 is 30 degrees, a value obtained by subtracting the angle AOA finally determined by the determiner 180 from 30 degrees may become a final direction angle based on the true north with respect to the direction of the wave signal source.

As described above, according to a determination method with respect to a direction of a wave signal source of the present invention that adds one more dipole antenna compared to the related art, only a single AOA value may be present with respect to a single phase difference as shown in FIG. 6. An ambiguity error that an AOA value with respect to reflected signals as shown in FIG. 4 according to the related art is detected is prevented. Also, in the present invention, as can be seen from a graph of FIG. 7 showing a relationship between an AOA according to a distance between the first dipole antenna (110 and 130) and the second dipole antenna (120 and 140) and an AOA error, the ambiguity error may be prevented by appropriately decreasing the distance between the first dipole antenna (110 and 130) and the second dipole antenna (120 and 140) to be about 0.5λ.

The hybrid direction detection apparatus 100 of the present invention measures an AOA around zero degrees among phase differences of waves received by two dipole antennas using the first dipole antenna (110 and 130) and the second dipole antenna (120 and 140) and thus, may very precisely detect a direction of a wave signal source. Also, even though a direction detection method using existing at least five circular array antennas cannot perform a direction detection with respect to a multi-reflected signal, the present invention uses the LP antenna 40 and thus, it is possible to perform an approximate direction detection even with respect to the multi-reflected signal. In addition, a precise direction detection may be performed through a one-time rotation of the LP antenna 40 and a one-time phase difference measurement of dipole antennas. Thus, compared to existing methods, it is possible to perform a very economical direction detection without using a large antenna or a circular array antenna and through a decrease in a RPM of the LP antenna 40.

Although the present invention has been described above with reference to predetermined matters such as specific constituent elements, limited exemplary embodiments, and drawings, they are provided only to assist the overall understanding of the present invention and not to be limiting of the present invention and thus, the present invention is not limited to the exemplary embodiments and those skilled in the art may make various changes and modifications without departing from the scope of the present invention. Accordingly, the spirit of the present invention should not be defined by the exemplary embodiments. The claims and the equivalents thereof should be understood to fall within the scope of the present invention.

What is claimed is:

1. An apparatus for detecting a hybrid direction, the apparatus comprising:
    a rotary machine including a rotary shaft;
    a log period antenna installed on the rotary shaft;
    a first dipole antenna installed on the rotary shaft and including first and second conductors spaced apart from each other;
    a second dipole antenna installed on a rotating shaft and including third and fourth conductors spaced apart from each other; and
    a phase signal processing apparatus configured to control the rotary machine to rotate the rotating shaft, to approximately determine a direction of a wave signal source based on strength of a signal received via the log period antenna to thereby suspend the rotation, and to determine an angle with respect to the direction of the wave signal source based on a phase difference between signals received via the first dipole antenna and the second dipole antenna in a state in which the rotation of the rotating shaft is suspended,
    wherein the determining of the angle with respect to the direction of the wave signal source includes determining, by the phase signal processing apparatus, a first phase difference between the first and fourth conductors and a second phase difference between the second and third conductors.

2. The apparatus of claim 1, wherein the first, second, third, and fourth conductors are aligned with each other along a straight line.

3. The apparatus of claim 1, wherein the phase signal processing apparatus determines the angle with respect to the direction of the wave signal source through a one-time rotation of the log period antenna and a one-time determination of a first phase difference between signals received from two most distant conductors among the four conductors constituting the first dipole antenna and the second dipole antenna, and a second phase difference between signals received from the two remaining conductors constituting the first dipole antenna and the second dipole antenna.

4. The apparatus of claim 3, wherein the phase signal processing apparatus calculates at least one first angle of arrival (AOA) in a range on each side of, and including, a first angle corresponding to the first phase difference, calculates at least one second AOA in a range on each side of, and including, a second angle corresponding to the second phase difference, and determines the angle with respect to the direction of the wave signal source by selecting any one of the at least one first AOA based on whether a minimum absolute value among the at least one second AOA is within a predetermined range from "0".

5. The apparatus of claim 4, wherein the phase signal processing apparatus calculates an AOA using the following equation, $$AOA(\Delta\phi, Ka) = \sin^{-1}\left(\lambda \frac{\Delta\phi + 360Ka}{2\pi d}\right)$$

where $\Delta\varphi$ denotes a phase difference, $\lambda$ denotes a signal wavelength, d denotes a distance between two corresponding conductors of a dipole antenna, Ka denotes $\pm$n, n=1 when $0.5<d/\lambda<1$, and n=4 when $1.1<d/\lambda<3.5$.

6. The apparatus of claim 1, wherein the phase signal processing apparatus sequentially performs an amplification of the signal received via the log period antenna, a frequency-down conversion, an analog-to-digital (A/D) signal conversion, and a signal strength calculation while rotating the rotating shaft, and determines a direction in which the strength of the signal is greater than the strength of the signal in the other directions, as an approximate direction of the wave signal source.

7. The apparatus of claim 1, wherein the phase signal processing apparatus comprises:
    a first switch configured to select any one of two signals of the first dipole antenna;
    a second switch configured to select any one of two signals of the second dipole antenna;
    a first frequency-down converter connected to an output of the first switch and a first A/D converter connected to an output of the first frequency-down converter;
    a second frequency-down converter connected to an output of the second switch and a second A/D converter connected to an output of the second frequency-down converter; and
    a phase difference detector configured to detect a phase difference between output signals of the first A/D converter and the second A/D converter,
    wherein the signal processing apparatus is configured to determine the angle with respect to the direction of the wave signal source based on the phase difference detected by the phase difference detector.

8. The apparatus of claim 7, wherein the phase signal processing apparatus further comprises:
    a first low noise amplifier (LNA) and a third LNA connected to the two conductors of the first dipole antenna, respectively; and
    a second LNA and a fourth LNA connected to the two conductors of the second dipole antenna, respectively,
    the first switch selects any one of an output of the first LNA and an output of the third LNA, and the second switch selects any one of an output of the second LNA and an output of the fourth LNA.

9. The apparatus of claim 8, wherein the first LNA and the second LNA are connected to the two most distant conductors among the four conductors constituting the first dipole antenna and the second dipole antenna, respectively, and
the third LNA and the fourth LNA are connected to the two other conductors among the four conductors constituting the first dipole antenna and the second dipole antenna, respectively.

10. The apparatus of claim 8, wherein the phase difference detector detects a first phase difference with respect to the output of the first LNA and the output of the second LNA and a second phase difference with respect to the output of the third LNA and the output of the fourth LNA, and
the signal processing apparatus determines the angle with respect to the direction of the wave signal source by comparing and analyzing the first phase difference and the second phase difference.

11. The apparatus of claim 10, wherein the phase signal processing apparatus calculates at least one first angle of arrival (AOA) about the first phase difference, calculates at least one second AOA about the second phase difference, and determines the angle with respect to the direction of the wave signal source by selecting any one of the at least one first AOA based on whether a minimum absolute value among the at least one second AOA is within a predetermined range from "0".

12. The apparatus of claim 11, wherein the phase signal processing apparatus determines a minimum first absolute value among the at least one first AOA as the angle with respect to the direction of the wave signal source when a minimum second absolute value among the at least one second AOA is within the predetermined range from "0", and determines a value having a smallest difference with the minimum second absolute value among the at least one first AOA as the angle with respect to the direction of the wave signal source when the minimum second absolute value is not within the predetermined range from "0".

13. A method of detecting a direction of a received signal at a hybrid direction detection apparatus using a log period antenna and first and second dipole antennas, the method comprising:
approximately determining a direction of a wave signal source based on a strength of a signal received via the log period antenna by rotating the log period antenna, the first dipole antenna, and the second dipole antenna installed on a rotating shaft; and
determining an angle with respect to the direction of the wave signal source based on a phase difference between signals received via the first dipole antenna and the second dipole antenna in a state in which the rotation of the rotating shaft is suspended,
wherein the first dipole antenna includes first and second conductors spaced apart from each other,
the second dipole antenna includes third and fourth conductors spaced apart from each other, and
the determining of the angle with respect to the direction of the wave signal source includes determining, by the phase signal processing apparatus, a first phase difference between the first and fourth conductors and a second phase difference between the second and third conductors.

14. The method of claim 13, wherein the first, second, third, and fourth conductors are aligned with each other along a straight line.

15. The method of claim 13, wherein determining the angle with respect to the direction of the wave signal source comprises:
performing a one-time rotation of the log period antenna; and
performing a one-time determination of a first phase difference between signals received from two most distant conductors among the four conductors constituting the first dipole antenna and the second dipole antenna, and a second phase difference between signals received from the two remaining conductors constituting the first dipole antenna and the second dipole antenna.

16. The method of claim 15, wherein the determining of the angle with respect to the direction of the wave signal source comprises:
calculating at least one first AOA in a range on each side of, and including, an angle corresponding to the first phase difference, and calculating at least one second AOA in a range on each side of, and including, an angle corresponding to the second phase difference; and
determining the angle with respect to the direction of the wave signal source by selecting any one of the at least one first AOA based on whether a minimum absolute value among the at least one second AOA is within a predetermined range from "0".

17. The method of claim 16, wherein the determining of the angle with respect to the direction of the wave signal source comprises:
determining a minimum first absolute value among the at least one first AOA as the angle with respect to the direction of the wave signal source when a minimum second absolute value among the at least one second AOA is within the predetermined range from "0", and
determining a value having a smallest difference with the minimum second absolute value among the at least one first AOA as the angle with respect to the direction of the wave signal source when the minimum second absolute value is not within the predetermined range from "0".

18. The method of claim 16, wherein the AOA is calculated using the following equation, $$AOA(\Delta\phi, Ka) = \sin^{-1}\left(\lambda \frac{\Delta\phi + 360Ka}{2\pi d}\right)$$

where $\Delta\varphi$ denotes a phase difference, $\lambda$ denotes a signal wavelength, d denotes a distance between two corresponding conductors of a dipole antenna, Ka denotes $\pm n$, $n=1$ when $0.5 < d/\lambda < 1$, and $n=4$ when $1.1 < d/\lambda < 3.5$.

19. The method of claim 13, wherein the approximately determining of the direction of the wave signal source comprises sequentially performing an amplification of the signal received via the log period antenna, a frequency-down conversion, an A/D signal conversion, and a signal strength calculation while rotating the rotating shaft, and determining a direction in which the strength of the signal is greater than the strength of the signal in the other directions, as an approximate direction of the wave signal source.

* * * * *